(12) United States Patent
Papa et al.

(10) Patent No.: US 11,490,348 B2
(45) Date of Patent: *Nov. 1, 2022

(54) SIGNAL QUALITY DATABASE

(71) Applicant: Parallel Wireless, Inc., Nashua, NH (US)

(72) Inventors: Steven Paul Papa, Windham, NH (US); Rajesh Kumar Mishra, Westford, MA (US); Sridhar Donepudi, Nashua, NH (US); Simon Mellor, Heathfield (GB)

(73) Assignee: Parallel Wireless, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/990,944

(22) Filed: Aug. 11, 2020

(65) Prior Publication Data
US 2020/0374823 A1 Nov. 26, 2020

Related U.S. Application Data

(63) Continuation of application No. 15/478,206, filed on Apr. 3, 2017, now Pat. No. 10,743,276, which is a (Continued)

(51) Int. Cl.
*H04W 56/00* (2009.01)
*H04W 24/10* (2009.01)
(Continued)

(52) U.S. Cl.
CPC ......... *H04W 56/006* (2013.01); *H04W 24/10* (2013.01); *H04W 52/241* (2013.01);
(Continued)

(58) Field of Classification Search
CPC ............. H04W 56/006; H04W 52/283; H04W 52/245; H04W 24/10; H04W 52/241;
(Continued)

(56) References Cited

U.S. PATENT DOCUMENTS

2003/0031135 A1* 2/2003 Itoh ..................... H04W 52/143
370/252
2008/0299995 A1* 12/2008 Spain ..................... H04W 64/00
455/456.6

(Continued)

*Primary Examiner* — Thai Nguyen
(74) *Attorney, Agent, or Firm* — Michael Y. Saji; David W. Rouille

(57) ABSTRACT

Systems and methods for a self-calibrating and self-adjusting network are disclosed. A method is disclosed, comprising: receiving mobile device measurement reports from a mobile device at a gateway situated between a radio access network (RAN) and a core network via a base station in the RAN; determining a location of the mobile device at a measurement time of the mobile device measurement reports; associating the location with the mobile device measurement reports into a measurement record; storing a plurality of measurement records obtained over a time period and over multiple mobile devices; and providing query access to the plurality of measurement records by retrieving results corresponding to a plurality of search parameters transmitted to the gateway.

16 Claims, 8 Drawing Sheets

Related U.S. Application Data continuation-in-part of application No. 14/936,267, filed on Nov. 9, 2015, now Pat. No. 10,757,660.

(60) Provisional application No. 62/317,315, filed on Apr. 1, 2016, provisional application No. 62/076,571, filed on Nov. 7, 2014.

(51) Int. Cl.
| | | |
|---|---|---|
| *H04W 52/24* | (2009.01) | |
| *H04W 52/28* | (2009.01) | |
| *H04W 24/02* | (2009.01) | |
| *H04W 64/00* | (2009.01) | |

(52) U.S. Cl.
CPC ....... *H04W 52/245* (2013.01); *H04W 52/283* (2013.01); *H04W 24/02* (2013.01); *H04W 64/00* (2013.01)

(58) Field of Classification Search
CPC ..... H04W 24/02; H04W 64/00; H04W 24/08; H04W 52/20
See application file for complete search history.

(56) References Cited

U.S. PATENT DOCUMENTS

| | | | |
|---|---|---|---|
| 2010/0299419 A1* | 11/2010 | Ramankutty | H04W 24/02 709/221 |
| 2011/0195725 A1* | 8/2011 | Bells | H04W 64/00 455/456.1 |
| 2017/0238245 A1 | 8/2017 | Mathai et al. | |

* cited by examiner

SIGNAL QUALITY DATABASE

CROSS-REFERENCE TO RELATED APPLICATIONS

This application claims the benefit of priority under 35 U.S.C. § 120 of U.S. patent application Ser. No. 15/478,206, filed Apr. 3, 2017, and entitled "Signal Quality Database," which itself both: claims the benefit of priority under 35 U.S.C. § 119(e) of U.S. Provisional Patent Application No. 62/317,315, filed Apr. 1, 2016, and entitled "Signal Quality Database"; and is a continuation-in-part of, and claims the benefit under 35 U.S.C. § 120 of, U.S. patent application Ser. No. 14/936,267, filed Nov. 9, 2015, and entitled "Self-Calibrating and Self-Adjusting Network," which itself claims the benefit of priority under 35 U.S.C. § 119(e) of U.S. Provisional Pat. App. No. 62/076,571, filed Nov. 7, 2014, and entitled "Self-Calibrating and Self-Adjusting Network"; each of the preceding of which is hereby incorporated by reference in its entirety for all purposes. Additionally, U.S. Pat. App. Pub. Nos. US20140086120, US20140092765, US20140133456, US20150045063, and US20150078167, and U.S. patent application Ser. Nos. 14/828,432 and 14/043,789 are hereby incorporated by reference in their entirety for all purposes.

BACKGROUND

It is helpful to be able to determine conditions at a mobile device, including location and channel quality. Various techniques are known for determining the position of a Long Term Evolution (LTE) user equipment (UE). For example, the location of the serving cell ID (CID) may be used as a rough approximation of the position of the UE; measuring certain network attributes such as round trip time (RTT) and angle of arrival (AOA) may be used to provide more information, known as enhanced cell ID (ECID); and, of course, global positioning system (GPS) or other global navigation satellite systems may be used to determine location. A reference signal time difference (RSTD) may also be used to calculate an LTE observed time difference of arrival (OTDOA). Two OTDOAs is sufficient to calculate the position of a UE. Other TDOA technologies include CDMA AFLT, GSM E-OTD, and WCDMA OTDOA-IPDL. Also, control plane positioning messages may also be exchanged between the network and the UE to determine the position of a UE.

Interference is a common problem in LTE networks. For example, using the 700 MHz band as an example, sources such as television broadcasts, cable television amplifiers, narrow-band radio transmissions and industrial equipment use these legacy channels, and these signals propagate readily across long distances and through building materials, causing interference. Even sources such as light bulb ballasts have been known to generate enough interference in these bands to negatively impact LTE performance. (See FCC File No. EB-FIELDWR-13-00008470.)

SUMMARY

Systems and methods for a self-calibrating and self-adjusting network are disclosed.

In a first embodiment, a method may be disclosed, comprising: receiving mobile device measurement reports from a mobile device at a gateway situated between a radio access network (RAN) and a core network via a base station in the RAN; determining a location of the mobile device at a measurement time of the mobile device measurement reports; associating the location with the mobile device measurement reports into a measurement record; storing a plurality of measurement records obtained over a time period and over multiple mobile devices; and providing query access to the plurality of measurement records by retrieving results corresponding to a plurality of search parameters transmitted to the gateway.

The method may further comprise obtaining the location of the mobile device at the base station using a radio frequency (RF) carrier synchronization method based on orthogonality of signals. The method based on orthogonality may be as described in U.S. patent application Ser. No. 14/043,789. The mobile device may be a user equipment (UE), the base station may be an eNodeB, and the database may be located at the gateway. The plurality of search parameters may include a geographic location parameter. The base station may be configured to forward received mobile device measurement reports from the mobile device to the gateway. The method may further comprise forwarding, at a base station in the RAN, measurement reports obtained from an attached mobile device attached to the base station to the gateway to be stored at the gateway without requiring further configuration at the attached mobile device. The method may further comprise adjusting transmission power for the mobile device at the base station based on a plurality of measurement records.

The method may further comprise computing the location of the mobile device at the base station or receiving the location of the mobile device from the mobile device at the base station. The method may further comprise calculating an average of a signal strength parameter within the mobile device measurement reports over a time window, and storing the average in association with the location. The method may further comprise associating the measurement record with a current time. The method may further comprise obtaining a signal strength parameter for the mobile device at the base station, The signal strength parameter may include at least one of a block error rate (BLER) and a radio signal strength indicator (RSSI), and the location may be a global positioning system (GPS) position, and forwarding the signal strength parameter as a mobile device measurement report. The method may further comprise storing a measurement record for a second mobile device. The method may further comprise associating the location and an aggregate signal strength parameter calculated from the plurality of measurement records from the multiple mobile devices.

The aggregate signal strength parameter may be calculated by averaging over time, averaging over the multiple mobile devices, or selecting a single value reflecting a relative minimum signal strength. The method may further comprise adjusting transmission power at one or more base stations based on the associated location and signal strength parameter to maintain a desired transmission range of the one or more base stations. The method may further comprise detecting an aberrant signal strength parameter, and sending an alarm message to a management system, to enable a network operator to address the aberrant signal strength parameter. The method may further comprise detecting an aberrant signal strength parameter, and adjusting transmission power at one or more base stations to ameliorate the aberrant signal strength parameter. The method may further comprise compiling a record of call drops per mobile device location at the gateway; and predicting future call drops based on the compiled record of call drops per location and a location parameter. The method may further comprise adjusting a first parameter at the base station for a first radio access technology, and adjusting a second parameter for a second radio access technology.

In a second embodiment, a method may be disclosed, comprising: receiving a signal quality measurement for a mobile device at a network node; and storing the signal quality measurement and a location of the mobile device in an associated record at an aggregation server. The aggregation server may be a gateway situated between a radio access network (RAN) and a core network, and The network node may be a base station in the RAN to which the mobile device may be attached.

The location of the mobile device may be determined using a radio frequency (RF) carrier synchronization method based on orthogonality of signals. The method based on orthogonality may be as described in U.S. patent application Ser. No. 14/043,789. The signal quality measurement may be one of call drop rate and block error rate, and The mobile device location may be derived from a global positioning service (GPS) coordinate location associated with the mobile device, and The mobile device may be a user equipment (UE). The method may further comprise deriving at least one aggregate parameter based on the stored signal quality measurement and location, and using the derived at least one aggregate parameter to adjust an operational network parameter. The mobile device location may be derived from a location of an associated tracking area or eNodeB. The aggregation server aggregates stored signal quality measurements from more than one mobile device. The network node may be one of a base station and an in-data path network node in a data path between the base station and a core network. The method may further comprise presenting one of real-time network conditions, historical network conditions, and projected future network conditions based on the stored signal quality measurement and the stored mobile device location.

In a third embodiment, a system may be disclosed, comprising: a gateway situated between a radio access network (RAN) and a core network, the gateway configured to receive mobile device measurement reports from a mobile device, to determine a location of the mobile device at a measurement time of the mobile device measurement reports, to associate the location and the measurement time with the mobile device measurement reports into a measurement record, and to store a plurality of measurement records obtained over a time period and over multiple mobile devices, the gateway further configured to provide query access to the plurality of measurement records by retrieving results corresponding to a plurality of search parameters transmitted to the gateway, The plurality of search parameters may include a geographic location parameter; and a base station in the RAN, the base station configured to forward measurement reports obtained from an attached mobile device attached to the base station to the gateway to be stored at the gateway without requiring further configuration at the attached mobile device.

DETAILED DESCRIPTION

Figure 1:
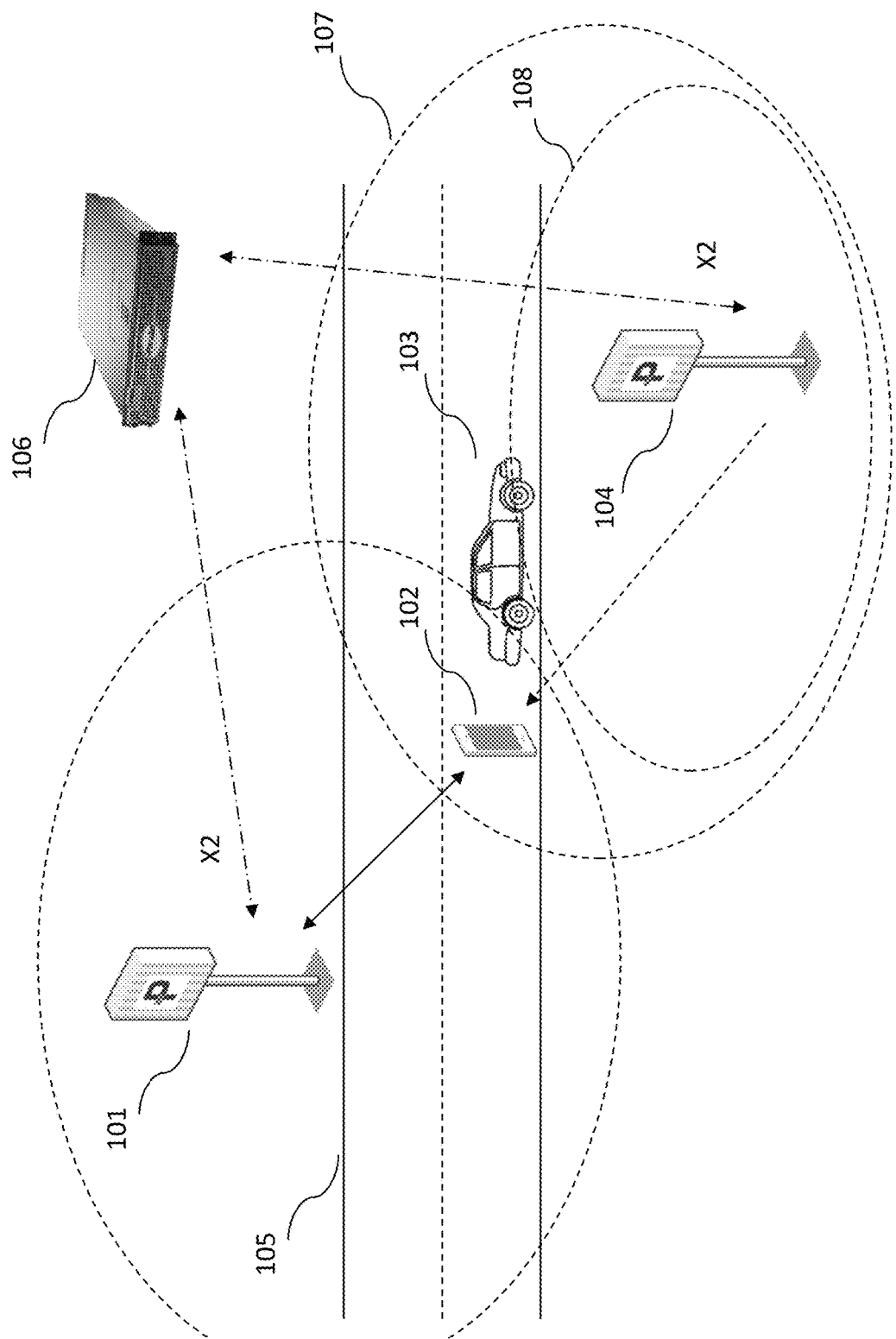
FIG. 1 is a schematic diagram of an interference scenario where a UE is attached to an eNodeB and experiences interference from another eNodeB on the network, in accordance with some embodiments.

In a mobile network, when a base station is introduced into an environment containing other base stations, it may be possible to make automatic adjustments of radio transmission power and other characteristics at the base station to provide coverage without interference over a geographic area. One or more UE characteristics, such as signal strength, as measured by a user equipment (UE) in the field, may be received at a base station and associated with the location of the UE. Real-time calibration of a subcarrier at the base station may be performed by adjusting radio transmission power while simultaneously receiving measurements of signal strength from UEs in the particular geographic area, until the desired signal coverage is achieved.

In one embodiment, a method is disclosed for sampling a parameter at a UE, receiving the location or position of the UE at a base station, associating the position and the value of the parameter, and storing that association at the base station and/or at a central server. The association may be stored in a table or database at the central server, or at an eNodeB. The parameter may be a signal strength parameter. Once the information is saved at the central server or eNodeB, transmission power may be adjusted based on the current location of the UE, or based on a prediction of the location of the UE, or based on a prediction of the signal strength at either the current location or the predicted location, or based on a prediction of the signal strength at the current time of day at the current or predicted location, or based on a prediction of traffic load at the current serving cell, or based on the bearer type and current access point name (APN).

The association may also include calculating an average of the signal strength parameter over time, over multiple UEs or over a single UE, and saving an association of the average with the position. The association may also include calculating an average signal strength over several days, over multiple UEs or over a single UE, and associating the average with the time of day. The association may also include a traffic load at the current serving cell, a bearer type, an access point name (APN), a currently-connected packet network, or other parameters.

The association may also include calculating a range of values that may be saved for later reference and comparison and that may be a range of ideal or desirable values for a signal strength parameter, an average signal strength parameter, or another parameter. This may help to filter out measurements from UEs that are exiting the coverage area of a base station, or transient poor signal conditions, or that are otherwise subject to poor signal.

In some embodiments, the signal strength parameter may include at least one of a bit error rate (BER), a block error rate (BLER), and a radio signal strength indicator (RSSI), and the position may be a global positioning system (GPS) position.

Multiple signal strength parameters from multiple UEs may also be aggregated or combined. Multiple signal strength parameter ranges from multiple UEs may also be aggregated or combined. In some embodiments, aggregated UE parameters may be filtered such that only measured signal strength values that fall within the ideal or desirable range for a given parameter are aggregated, averaged, or combined.

In this disclosure, a coordinating server is mentioned that is located in the network between the radio area network (RAN) and the core network, as a gateway in the data path, in some embodiments. By locating the coordinating server between the RAN and the core network, the coordinating server is enabled to, among other things, ensure that any measurements or heuristics accurately reflect the current state of the RAN, and also to filter out any unnecessary signaling to or from the RAN before it reaches the core network. The coordinating server is also well-placed for performing adjustments to the RAN, in contrast to the core network, which is mainly concerned with the delivery of services to UEs.

Radio Frequency Channel Characteristics

UEs periodically send measurement reports indicating the signal strength of their serving base station and of neighbor base stations. In some embodiments, these measurement reports may be used to determine the signal strength parameters described below.

Radio frequency channel characteristics may change due to any of various factors, including factors such as large objects in the path causing differing path interference, foliage, weather, etc. In some embodiments, any changes in radio frequency conditions may be monitored and used in conjunction with location to perform signal calibration. Weather or other such parameters may be received from other sources or from the UE itself, associated with the location of the UE, and used to perform power calibration at a base station.

Performance Information Received from UEs

In some embodiments, information received from UEs may be stored, forwarded, tracked, and/or reported in real time. For example, a UE may be attached to an eNodeB, which may be attached to a coordinating server. If the UE is on a call and the call is dropped, that information may be relevant for assessing the performance of the network.

This information may be monitored in several ways. For example, a latency value or a block error rate, or another value representing the quality of the signal, such as RSRP/RSRQ, may be continuously monitored, such that at intervals, such as once every TTI or once every hundred TTIs, or at a configurable monitoring interval, a quality measure is recorded. The quality measure may be sent to the coordinating server to allow the coordinating server to monitor the current quality of every call at all times. The coordinating server may aggregate the information to allow monitoring of call quality as an average, or as a moving window, or as a view of the best/worst quality measures, or of the best/worst performing eNodeBs, or using another aggregation method.

As another example, the number of call drops per UE identifier may be maintained. The UE identifier may be, for example, an IMEI. In the case that a call is dropped, the drop may be recorded and aggregated to provide a continuous sample of the percentage of calls dropped, aggregated by UE, by eNodeB, by geographic region, by distance from the eNodeB, or otherwise aggregated to provide relevant information to a network operator. As another example, specific IMEIs may be identified that relate to high-value persons on the network. The number of drops suffered by those specific people may be monitored in detail, wherever they occur on the network.

As another example, traffic types may be monitored, on a per-UE, per-location basis. For example, voice calls, data streams, specific data stream types like streaming audio or hypertext transport protocol (HTTP), or other traffic types may be identified by deep packet inspection, by envelope inspection, by explicit tagging, or in conjunction with other layers in the network at the eNodeB or central server, or with the help of other network nodes. Signal quality parameters that are appropriate for each traffic type may be specifically monitored, such as call drop rate for voice calls and block error rate for data connections. In some embodiments, voice and data emergency services usage may also be separately tracked and monitored.

In another embodiment, deployment of network probes and samplers may be enabled using a coordinating server. Network probes and samplers may be coupled to monitoring stations or base stations and used to monitor the operational characteristics of a network, including any of the characteristics mentioned above. A network operator may desire to deploy such probes and samplers to assess the quality of a network. Since in some embodiments information pertaining to the quality of the network are sent to the coordinating server, the probes and samplers may be configured to attach directly at the coordinating server, thereby receiving all relevant information. The coordinating server may allow different subsets of eNodeBs controlled by the coordinating server to be accessed for network monitoring. Where UE measurement reports are described in this disclosure, probes and samplers may also be used, including in combination with UE measurement reports, and vice versa. In some embodiments, additional radios may be added to one or more base stations to provide sniffing capability without a reduction in operational radio capacity.

In another embodiment, A/B testing may be enabled by the use of real-time statistics collected at the coordinating server. For example, if a device such as an eNodeB has a remote configuration capability, a system user may provide configuration "A" to the eNodeB at a first time, and may log and monitor all operational statistics from that eNodeB with that configuration, and then may later provide configuration "B" at a second time, such as at the same time of day on a different date, logging and monitoring those statistics as well, and may subsequently compare the operational logs for operating the eNodeB with the two configurations. Similar A/B testing may be performed using two eNodeBs in different geographic areas at different times. Similar A/B testing may be performed using any parameters described throughout this disclosure, such as location, throughput, bearer type, traffic load, target APN, etc.

In some embodiments, data may be collected as frequently as once every TTI for every UE. In some embodiments, less data may be collected. In some embodiments, data may be retained for a brief interval, such as one day; in other embodiments, data may be retained for several months to years. In some embodiments, the statistics may be aggregated at the coordinating server and sent further upstream upon request only, to reduce backhaul load. In some embodiments, monitoring data may be stored at the coordinating server; in other embodiments, data may be stored elsewhere as well as, or instead of, at the coordinating server, depending on whether it is costly to provide the required amount of storage at the coordinating server. In some embodiments, data may be solicited in the form of UE measurement reports by the base station; in some embodiments, measurement reports may be requested at the initiative of the core network or a coordinating gateway, or at the initiative of the base station itself Association In some embodiments, the location data may be associated with one or more radio performance parameters, as shown below.

TABLE 1

| GPS Location | Time | RSSI |
|---|---|---|
| x, y, z | T1 | −80 |
| x, y, z | T2 | −60 |
| x, y, z | T3 | −40 |

In Table 1, a plurality of records is shown, each with a GPS coordinate including a latitude, a longitude, and an altitude; a timestamp, including a time of day as well as a calendar date; and a received signal strength indicator (RSSI). Records may include other associated information. In some embodiments, a GPS coordinate that includes a latitude and a longitude, is stored. In some embodiments, the GPS coordinate also includes an elevation. In some embodiments, GLONASS, A-GPS, Galileo, IRNSS, BeiDou, dead reckoning, positioning using RF triangulation, or another positioning system may be used. In some embodiments, fine-grained or detailed positioning information may be determined, potentially based on angle of arrival or based on an orthogonality of a received RF signal as detailed in U.S. patent application Ser. No. 14/043,789, and may be stored as a GPS coordinate. In some embodiments, indoor location information may be stored. In some embodiments, a coordinate system other than lat/long or GPS may be used. If a plurality of coordinate systems are used, metadata about the systems may be stored to permit translation between them. In some embodiments, velocity, tracking area, or other incomplete location information may be combined to form a positioning coordinate for recording. In some embodiments, a traffic load for a current serving cell, an in-use bearer type, a particular APN in use, other signal strength information, or other information may be stored.

In some embodiments, fewer than the maximum number of significant figures are stored, to improve the ability to retrieve other neighboring records, and to reduce storage requirements. A UE identifier is stored, which may be an international mobile equipment identifier (IMEI), an international mobile subscriber identity (IMSI), or another UE identification parameter. A time of the measurement is optionally stored. A minimum required RSSI (showing signal strength) is optionally stored. A minimum required block error rate, or BLER (showing quality of data) is optionally stored. For example, a row in a table to be stored in a data store could be: GPS (42.70, −71.45), Time (12:00:00 PM), Min_RSSI (8), Min_BLER (10%). The table may be stored at a central node, or as a database stored at one or more eNodeBs (which may be a distributed database). The table may be accessed using the GPS location as a key, or using the time as a key, or using the UE identifier as a key. The data may be visualized on a map through a web-based application portal.

Other parameters may also be stored and associated as part of a single record. For example, weather type, weather statistics including precipitation and humidity, call drop percentage, handover success percentage, cell overload percentage, quality of service requested, packet drop rate, modulation type, modulation change rate, round trip delay, call setup time, call setup success rate, standalone dedicated control channel (SDCCH) congestion, ping time to various hosts, traceroute path, uplink or downlink throughput, velocity, reference signal received power (RSRP), reference signal received quality (RSRQ), signal to noise ratio, physical cell ID (PCI), evolved cell global identifier (ECGI), or any other may also be stored in the table above and associated with one or more of the GPS location, the time, or the UE identifier.

In the case of parameters such as RSSI or BLER, it may be helpful to store a minimum value. The minimum may be a threshold that may reflect the minimum value seen at that location in the past. If a UE submits a measurement report reflecting a lower parameter value than the stored threshold value, a determination may be made to increase transmission power, in some embodiments. In some embodiments, a maximum value may also be stored and used to determine when to decrease transmission power.

The information may be stored in a standard structured query language (SQL) database, a key-value store, a non-SQL database or noSQL database, a vertical or horizontal record store, or any other information storage system. The information may be made accessible to reporting software, dashboard software, indexing software, aggregation software, or any other software that can perform analytics or analysis on the data.

The information may be analyzed using a geographic information system (GIS) or mapping-based platform providing planning, analysis, operational awareness, and asset management functionality, such as ArcGIS. Geocoding may be applied to location data. The information may be integrated with a web-based mapping system such as Google Maps, Apple Maps, Bing Maps, or another such system, and may be integrated with the web-based mapping system using JavaScript or another web scripting or programming language.

The information may be displayed using a visualization system, including as a geographic overlay, or as a graphical display of thresholds, alerts, alarms, signal strength data, or other information. The information may be animated over time, or time may be displayed by use of overlays, or made manipulable by use of a scroll controller. Colors may be used in a visualization to represent different signal strengths, enabling an operator to see signal strength at a glance, even animated over time.

In some embodiments, newly-received information may be averaged with the previously-stored information, or otherwise averaged to produce a smoothed value being stored in the table. In some embodiments, an angle of approach and a round trip time may be used to compute signal strength or location. In some embodiments, the GPS coordinates may be received from the UE at the base stations; in other embodiments, the GPS coordinates may be received from the UE at the core network or at a coordinating server, and then transmitted to and stored at one or more base stations. Alternatively, GPS coordinates may be computed at the base station, for example via triangulation, or may be assigned based on heuristics, lookup tables, or other information at the base station.

Power Adjustments and Other Adjustments

Once the information above is received from a UE, a determination may be made, either at a coordinating server, or at a base station, whether and how much to increase or decrease transmission power. In some embodiments, carriers, subcarriers, resource blocks, frequencies, channels, or other radio resources, and power levels thereof, may be adjusted individually. In some embodiments, transmission power of individual resource blocks may be adjusted in order to target specific UEs. In some embodiments, individual resource blocks may be adjusted to provide coordinated multi-point (CoMP) capability. In some embodiments, a UE-specific adjustment may be stored and replayed for every transmission to that UE.

Any increase or decrease of transmit power at a particular base station may then cause a corresponding decrease or increase in transmit power at neighboring base stations, in some embodiments. The coordinating server may transmit a request to the neighboring base stations to perform the corresponding decrease or increase. The coordinating server may also specifically request a particular power level to the neighboring base stations. The coordinating server may also initiate an increase or decrease in power level, to either increase or decrease a coverage area, or to maintain a prior coverage area or signal quality level. Any of the above types of power adjustment may be performed at the neighboring base stations. A hysteresis period may be included, such that a given power adjustment causes neighboring base stations to be adjusted after the hysteresis period. After a second hysteresis period, the coordinating server may cause the original base station's power to be adjusted again, and so on.

In some embodiments, a cap may be placed on the number of iterations to be used for adjustment of power. In some embodiments, the cap may be 64 iterations. In some embodiments, a sliding window may be used for the thresholds. In some embodiments, the thresholds may vary with time of day or by another parameter as described herein. In some embodiments, the values stored in the parameter table may be reset to an initial value after a given time, a user-configurable time, or upon administrative user request.

Transmit power is one example of an operational network parameter, and any operational network parameter could be adjusted based on the methods described herein. Operational network parameters include any parameters that affect the performance of the network, including thresholds, hysteresis periods, radio directionality, signal levels, signal quality thresholds, power levels, network paths, network node selection heuristics, handover parameters, quality-of-service (QoS) or QoS class identifier (QCI) parameters, modulations and modulation schemes, encodings, traffic shaping parameters, and prioritization information. In some embodiments, any and all of these parameters may be automatically controlled and adjusted or tested as a result of the methods described herein. In some embodiments, control over power level, etc., may be performed on a limited basis, such as limited per resource block, per frequency, or per time slot.

In some embodiments, parameters appropriate for a specific radio access technology (RAT) may be adjusted. For example, different parameters may be used for 3G versus for LTE. In some embodiments, certain parameters may be adjusted for 3G and for LTE in a multi-RAT base station. Multiple parameters may be adjusted at one time. In some embodiments, power or other parameters may be adjusted in one way for one RAT, and another way for another RAT. For example, if an interferer is detected in the 2.4 GHz range during a particular time of day, a Wi-Fi RAT may be directed to cause carriers during the time of day to use more robust modulation or error coding, and to lower a threshold for handover to a 4G RAT; and, a 4G RAT may be directed to optimize for a greater number of users by more aggressively pushing LTE UEs from RRC-Connected state to RRC-Idle state. The concepts described herein are contemplated by the inventors to be broadly applicable to 2G/3G/4G/5G/Wi-Fi and multi-RAT RANs.

In some embodiments, a base station antenna may have directional characteristics, for example, using multiple-in, multiple-out antennas, or using a directional antenna, or using a repositionable antenna. The directionality of the base station antenna may be controlled using the methods described in this disclosure. As the position of an interference source is often able to be pinpointed using the disclosed methods, adjusting the positioning or directionality of an antenna can be performed taking the position of the interference into consideration.

In some embodiments, a coordination server may control a plurality of base stations within the network. The coordination server may interpret information received from one UE at one base station and determine whether the information should be applied elsewhere in the network. For example, for certain embodiments where foliage may be detected, detection of increased foliage at one base station may trigger a systematic evaluation of foliage-related signal degradation, and perhaps a plurality of power adjustments, throughout the entire network. Thus, the automatic control and adjustment of the entire network is enabled by the methods described herein.

Both open loop and closed loop feedback algorithms are contemplated. For example, a one-time upward adjustment to transmit power may be employed to enhance signal quality in a particular location. This is open loop in that, although future feedback is contemplated, only one adjustment is made based on one input, with no additional sampling is performed to determine the adjustment. Alternatively, a closed-loop transmit power adjustment may be performed, where transmit power is adjusted multiple times while monitoring additional signal quality measurements from the affected mobile device or devices.

Aggregation

In some embodiments, a coordination server may be coupled with an aggregation module or aggregation server. The aggregation module may retrieve a plurality of records from the database, and compute an aggregation of records in the database to enable an operator to evaluate the network at a high level. For example, records may be aggregated over time to generate KPI reports for performance during a time period at a particular location, and the list of poorly-performing locations can be added to a list for follow-up.

In some embodiments, a coordination server may be enabled to show real-time network conditions to an administrative console. This would be enabled by the coordinating server soliciting measurements from one or more UEs, the coordinating server aggregating these measurements if needed, and the coordinating server presenting this information directly in real time to the administrative console. In some embodiments, real-time network conditions may be used to perform immediate adjustments, and an administrator or automated control process may evaluate the effect of the changes, providing a closed-loop control system.

In some embodiments, the aggregation module may be used to generate projected future network conditions. For example, using a time-based heuristic, the aggregation module may generate a projected future network condition for each hour of the day on a specified calendar day. As another example, the aggregation module may be used to project a signal degradation (or improvement) relating to increased foliage (or decreased foliage). As another example, the aggregation module may be used to assess a total or average capacity measurement in a given location. For example, a total throughput at the location, a total number of users at the location, or an estimated number of call drops at a location may be calculated.

Aggregation may be performed over a location or a region, in some embodiments, to, for example, identify coverage gaps, areas where coverage is good, areas where interference affects coverage, and other geographic regions with desirable or undesirable radio coverage characteristics. Aggregation may be performed over a time period, in some embodiments, to, for example, identify times when coverage is good, times when coverage is poor, times where less coverage is needed, and so on.

Aggregation may be performed over a particular UE or set of UEs. For example, a high-priority user or VIP may be monitored by the network operator to determine whether the VIP has any gaps in coverage throughout his or her day. Aggregation may also be performed for a particular eNodeB or set of eNodeBs, to determine, for example, whether a number of call drops is excessive at a particular eNodeB, or if signal quality is poor or good for UEs attached to a particular eNodeB.

In some embodiments, an expected range of operational parameters may be determined for a given location by looking at records collected over time. This provides a self-calibrating and self-adjusting capability to the network. Self-calibration can be used to determine whether a value is exceptional, by observing a network event, where network event is used loosely to mean any event in the network, calculating a mean and standard deviation of the distribution of the measurements of all prior network events, and determining whether the newly-observed network event is exceptional. This method can be used to set thresholds for operational parameters in the system.

In some embodiments, when a network event is received by a coordinating server that falls outside of the normal operational parameters of the network, an alarm may be triggered to notify the network administrator, or an automated process such as the automatic adjustment processes described herein may be triggered, or both. Alarms may be displayed at an administrative console. Filters may be used to manage which alarms are visible.

In additional embodiments, the inventors have contemplated the use of a method to determine the location of a UE as described and disclosed in U.S. patent application Ser. No. 14/043,789, "RF Carrier Synchronization and Phase Alignment Methods and Systems," which is hereby incorporated herein its entirety for all purposes. Using a method as described in U.S. patent application Ser. No. 14/043,789, or another RF carrier synchronization method, it is contemplated that a base station may obtain the position of a mobile device with great accuracy. The position may then be stored in a database. The position may be associated with a particular mobile device, using a mobile device identifier, such as an IMEI.

In some embodiments, the position may be associated with a location coordinate in the database. Specifically, the position may be stored in a single record in the database with location coordinates and a timestamp. The database may allow aggregation using the location coordinates. The database may allow aggregation using the location coordinates such that different levels of precision may be used to obtain different aggregations of the underlying data. For example, data points that are located very close to each other may be coalesced into a single data point or into a data point reflecting the number of underlying coalesced data points. The database may support aggregations for all data points matching a particular location to within 1 cm, within 10 cm, within 1 m, within 10 m, within 1 km, or with a different filter. As an example, this may allow the system to identify all cell phones within the boundaries of a store with an accuracy of within 1 m using an aggregation of the underlying data to speed up processing.

In some embodiments, the database may also permit coalescing or aggregating of data points from the same device or user equipment, by itself or together with the aggregation based on location. This may allow the system to identify that all locations within 1 m obtained during a particular time period for a particular UE are location coordinates of the same device that may be considered not to have moved during that time.

In some embodiments, the database may permit locations of UEs to be plotted on a 2D scatterplot of data points on latitude and longitude as the axes, or on a 2D map view, or a 3D scatterplot adding a third axis of elevation. The system may permit updating the map view in real time based on the obtained location data. The system may permit playback of a plurality of records in the database as an animation of the 2D or 3D view showing individual UEs in motion. Information about signal quality stored in the database for each UE may be shown above visual representations of individual UEs as graphs, bar graphs, charts, numbers, colors, animations, blinking images, or other visual representations. Call drops may be represented using animations.

In some embodiments, the location of a mobile device or UE may be obtained. This may be using an angle of arrival (AOA), or by using an RF carrier sync method, or by using a phase error to determine an angle of arrival, or another method. The location may be obtained in less than 50 ms. The location may be obtained in two dimensions using two receivers or in three dimensions with three receivers. The location may be obtained using a combination of angle-of-arrival and distance information. In some embodiments, the location of the mobile device or UE may be augmented or determined using UE location determinations (e.g., a GPS coordinate readout received from the UE itself) or from network location services (e.g., such as those used by core networks to determine location of UEs for paging purposes or for emergency services purposes). The AOA method may be based on orthogonality or phase error, and may be as described in U.S. patent application Ser. No. 14/043,789. One benefit of using the method described in U.S. patent application Ser. No. 14/043,789 is that this method provides accurate indoor positioning, which is not possible with GPS.

In some embodiments, a signal quality database as described herein may be used to establish a map of interferers in a region. The map may include a list of identified neighbor cells, which may include their PCI and EARFCN or other identifying information. The map may also include a list of interferers. The neighbor cells and the interferers may have an estimated location and an estimated signal strength. These estimates may be based on analysis of received signal measurements from UEs.

For example, if two UEs report a particular PCI of a neighboring cell, the location of the UEs is used to determine whether the identified neighbor cell is closer to one UE or the other UE. Three measurements may be enough to triangulate the location of the identified neighbor cell. If the UE receives measurements from the neighbor cell, the frequency band of the neighbor cell is likely to be known as well. In some cases, assumptions may be made about the identified neighbor cell, such as power level; for example, if the rough location of a neighbor cell is known, and the database contains one or more typical default values for the power level of the neighbor cell (e.g., 10 W, 20 W, 40 W, 80 W), the database may assess whether one of the default power levels is consistent with the received UE measurements, may store a power level as corresponding to the received UE measurements, and may assign a reliability score or probability score for the estimate.

In some cases, the identified neighbor cell may itself be present in the operator database, with a known power level and known location, possibly including GPS coordinates. In such a case, the known neighbor cell may also be added to a list of interferers and may also be displayed on a map.

As another example, if a number of UEs report poor signal in a particular location, a centroid around the region where the interference is detected can be marked as an interference-heavy region, with respect to the frequency band being used by the serving RAN for the UEs, and this information may be used for future radio network planning. The same techniques described in the preceding paragraphs may be used to, for example, assess the location of an interferer; estimate the power of an interferer; estimate the affected frequencies for the interferer; and estimate the region of interference caused by the interferer.

In some embodiments, the signal quality database may be updated frequently, e.g., in real time or near real time. A rapid pace of updates may enable the RAN to perform SON and power control operations rapidly in response to changes in the radio environment.

In some embodiments, the signal quality database may be combined with a database containing known topological and geographic features of a particular geographic area. For example, it is well-known that cell towers located at higher elevations provide effective signal quality for greater distances. In some embodiments, multipath and line of sight conditions may be taken into account by the database.

In some embodiments, UE measurement reports tagged with location may also be analyzed together with reports regarding uplink and downlink bandwidth. This helps deal with the common situation where third party radio interference or propagation of signal is not a problem, but the capacity of the serving base station is the limiting factor. Receiving, storing, and analyzing measurement reports together with capacity measurements enables a radio operator to view, on a map, the areas where network additions or optimizations should be made.

An example of an autonomous, cognitive approach for network outage detection that could be used in some embodiments with the information gathered according to this disclosure is "An Approach for Network Outage Detection from Drive-Testing Databases," Jussi Turkka et al., Journal of Computer Networks and Communications (2012), which is hereby incorporated by reference in its entirety for all purposes.

One of the advantages of the present disclosure is that it is possible to passively receive measurement reports from UEs. In some embodiments, in the normal course of operation, a UE may be given a measurement configuration, which may require the UE to provide measurement reports on either an event-triggered basis or a periodic basis. UE measurement reports are commonly used to enable a cell to determine when to perform handover for a specific UE. Examples of event triggers include: A1: Serving Cell becomes better than a defined threshold; A2: Serving Cell becomes worse than a defined threshold; A3: Neighbor cell becomes some offset better than the primary cell; A4: Neighbor cell becomes better than a defined threshold; A5: Primary cell becomes worse than a defined threshold and a neighbor becomes better than a second threshold; A6: Neighbor cell becomes some offset better than the serving cell; B1: Inter-RAT neighbor becomes better a defined threshold; B2: Primary cell becomes worse than a defined threshold and inter-RAT neighbor becomes better than a second threshold. As the UE performs measurements and transmits the measurements via measurement reports, the UE sends these reports to the eNodeB. Using a specially configured eNodeB, it is possible for the eNodeB to merely forward these to a central gateway, located between the RAN and the core network, and for the central gateway to obtain valuable information about conditions in the network. In some embodiments, the central gateway may control the RAN nodes to cause them to forward measurement reports to it; in some embodiments, this control may be obviated by instructions at the RAN nodes. In some embodiments, the central gateway may request the measurement reports from a RAN node, and in some embodiments this request-based method may be used to allow the central gateway to interoperate with any third-party RAN node.

In some embodiments, in addition to 3GPP UE measurement reports, any or all of the following may be collected and stored in the database, together with the UE's location information: Detailed serving system information with MNC, MCC, CID, etc.; Full received signal measurements for active and neighbors; Uplink power control parameters; RACH parameters such as TX Max, RX Min, TX Pwr and Preambles; Detailed information on packet scheduling (TBF state, TS allocation, CQI & BLER %); Data throughput measurements; Full Layer 3 and RRC signaling; RSRP, RSRQ; carrier to noise ratio; carrier to interference ratio; HARQ statistics; rank indicators. In addition to traditional wireless carrier channel statistics, tools like iPERF could be deployed using the same method, and UEs directed to send back information pertaining to application-layer throughput and error rate.

In some embodiments, graphical map views may be generated using preconfigured map data and an overlay showing one or more RAN base station parameters, for example, SINR or handover frequency. In some embodiments, UE measurements within a particular time window could be collected to provide a virtual drive test. A particular UE could be used to simulate the drive test UE, or a plurality of UE measurements could be used. In some embodiments, a real time view could be used instead of a virtual drive test.

In some embodiments, an indoor virtual drive test functionality could be provided, simulating a drive test within an indoor environment by collecting data from UEs within an indoor environment during a particular time period. U.S. patent application Ser. No. 14/043,789 provides a method for accurate indoor positioning without GPS. In some embodiments, providing signal measurements in an indoor environment may be performed, and an indoor coverage and interference map may be able to be created using the information gathered by the methods and systems disclosed herein. Accurate indoor positioning to the level of feet or inches of accuracy may allow, for example, a shopping mall operator to perform radio network planning and to determine where to place small cell base stations. Alternatively, the gathered cellular signal strength measurements could be reused to provide a map of foot traffic within the shopping mall. This technique could be applied to any indoor facility.

Small cells, DAS antenna systems, Wi-Fi access points, and indoor radio base stations could be used in conjunction with an indoor application of the present disclosure.

In one embodiment, a method is disclosed, comprising: obtaining a signal strength parameter for a mobile device at a base station; obtaining a position of the mobile device at the base station using a radio frequency (RF) carrier synchronization method based on orthogonality of signals; and associating the position and the signal strength parameter in a database. The method based on orthogonality may be as described in U.S. patent application Ser. No. 14/043,789. The method may further comprise one or more of: adjusting transmission power for the mobile device at the base station based on the associated position and signal strength parameter; computing the position of the mobile device at the base station; calculating an average of the signal strength parameter over a time window, and storing the average associated with the position. The signal strength parameter may include at least one of a block error rate (BLER) and a radio signal strength indicator (RSSI), and the position may be a global positioning system (GPS) position.

Figure 6:
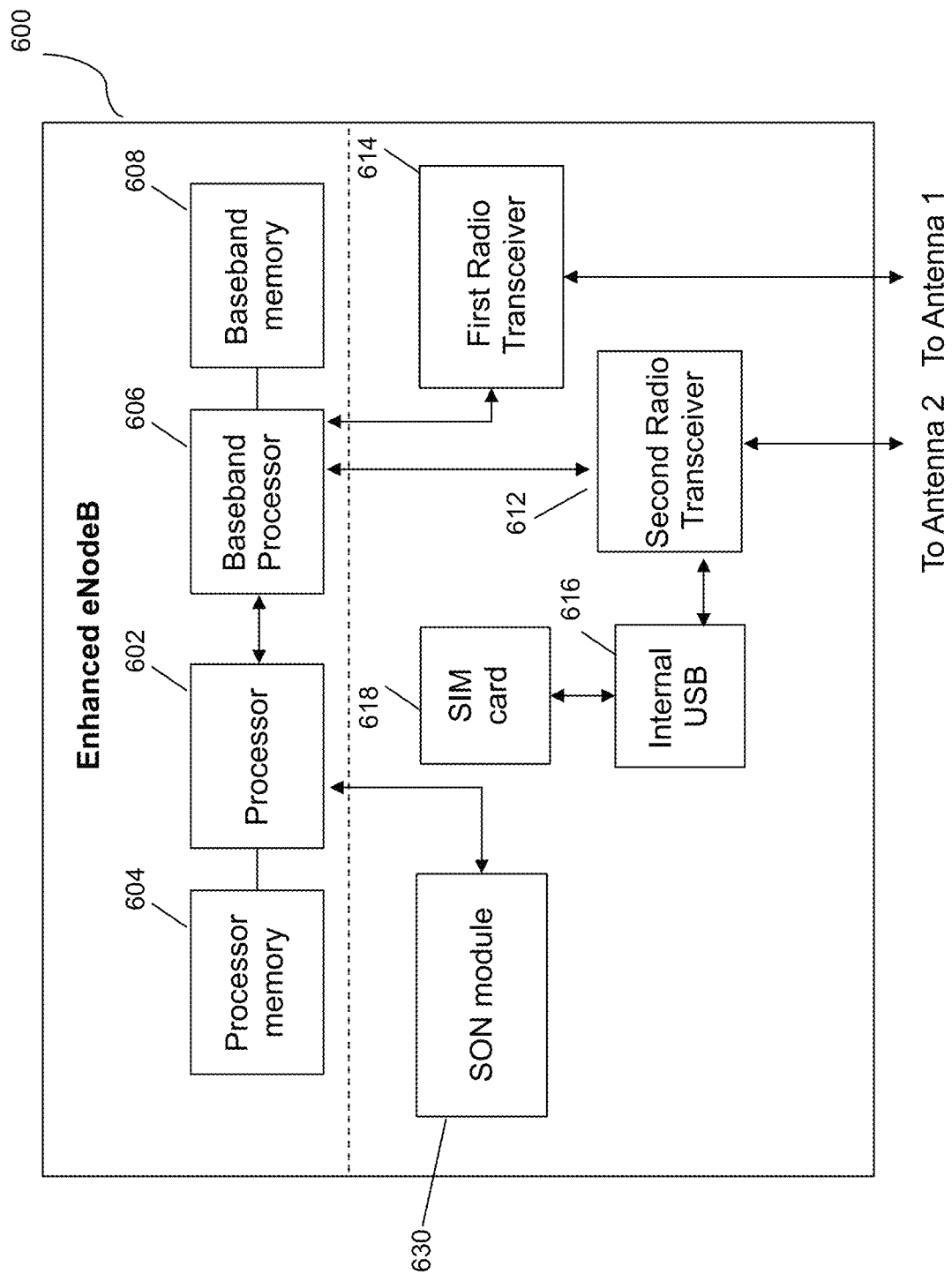
FIG. 6 is a schematic diagram of an enhanced eNodeB, in accordance with some embodiments.
Figure 7:
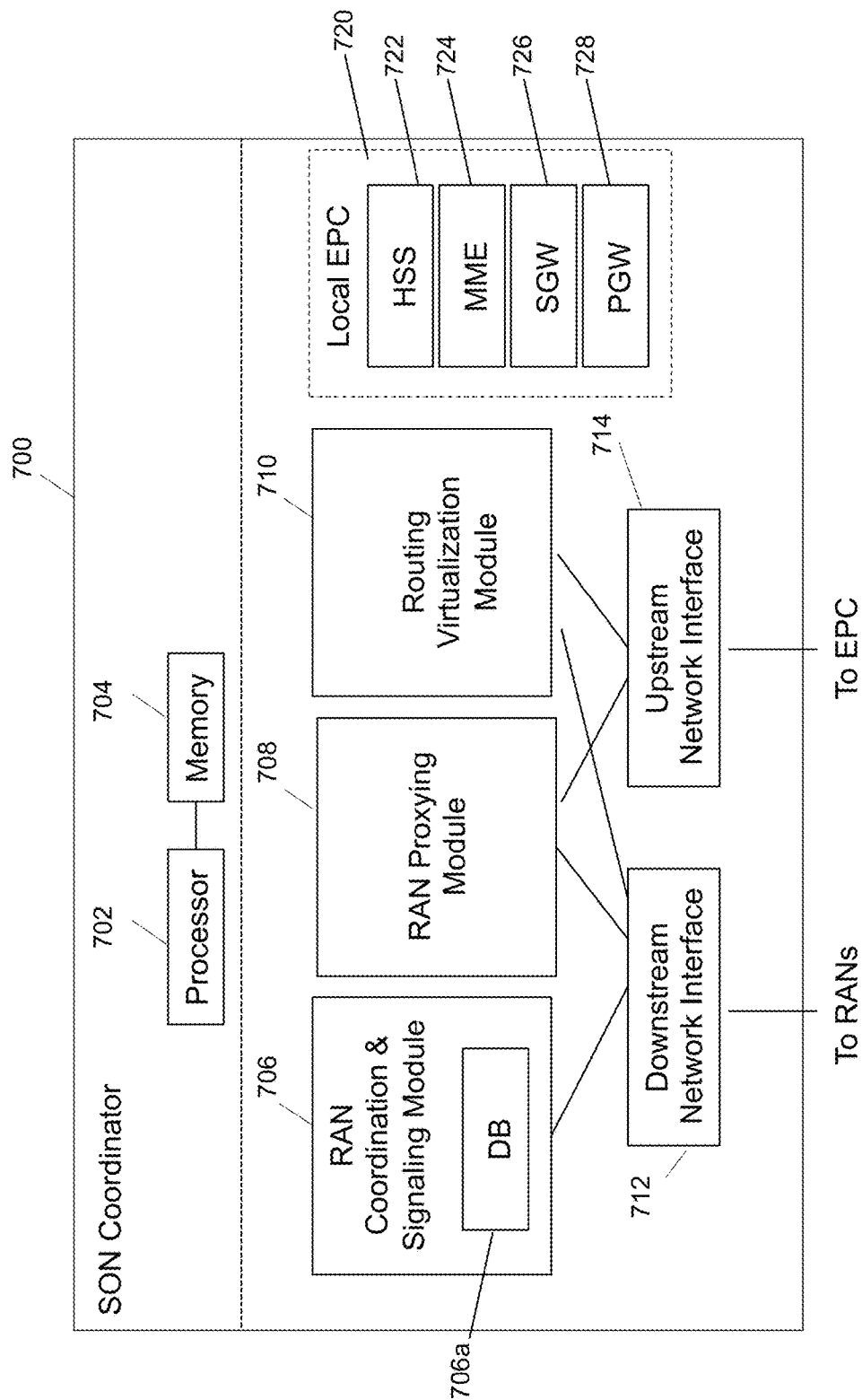
FIG. 7 is a schematic diagram of a SON coordinator server, in accordance with some embodiments.
Figure 8:
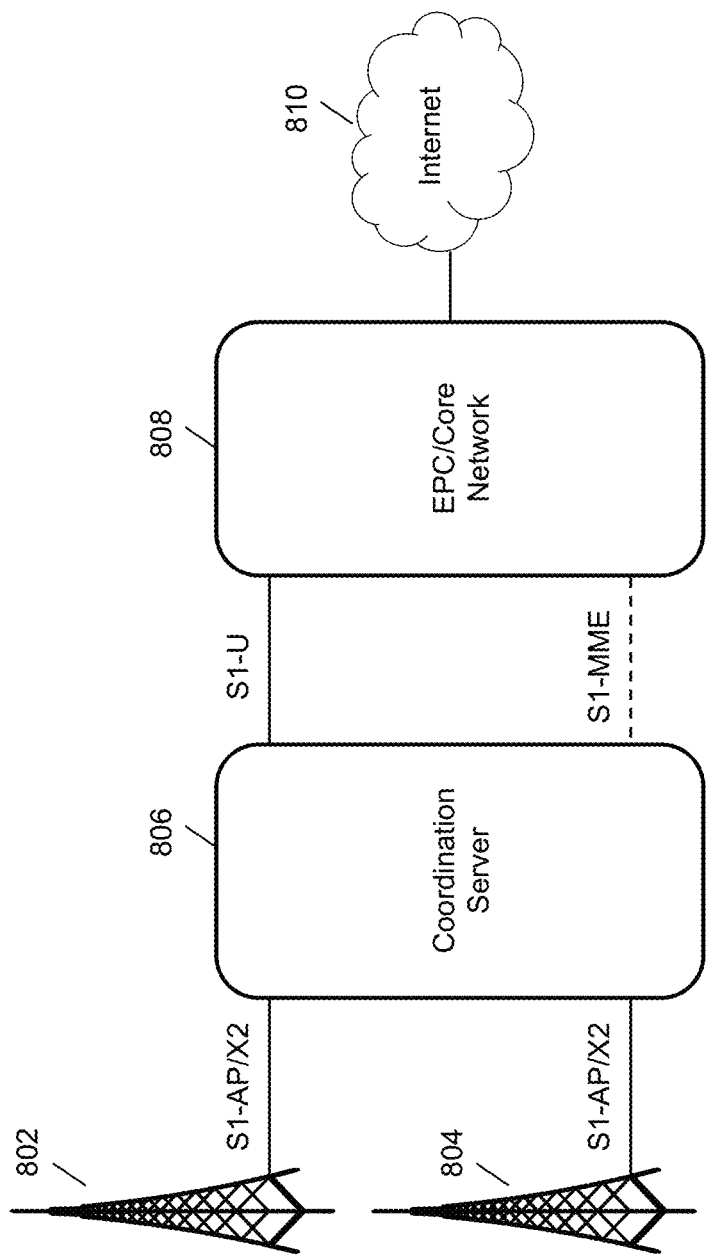
FIG. 8 is a system architecture diagram of an exemplary network configuration, in accordance with some embodiments.

The following FIGS. 1-5 show scenarios for what is possible using the disclosed system. FIGS. 6-8 provide information regarding hardware that may be used to embody the disclosed system.

FIG. 1 is a schematic diagram of an interference scenario where a UE is attached to an eNodeB and experiences interference from another eNodeB on the network, in accordance with some embodiments. eNodeB 101 is part of an operator network. A UE 102 is attached to eNodeB 101, and is traveling inside a vehicle 103 along a highway 105. UE 102 is experiencing interference from eNodeB 104. Also part of the network are eNodeB 104 and coordinating server 106.

eNodeB 101 and eNodeB 104 are being coordinated by coordinating server 106, including by the use of an X2 protocol connection as shown. Coverage area 107 and coverage area 108 reflect differing transmit power states of eNodeB 104.

In some embodiments, coordinating server 106 may be acting as an eNodeB S1 proxy to the core network (not shown), such that both eNodeB 101 and eNodeB 104 appear to the core network as a single eNodeB, and such that their operational parameters are essentially under the control of coordinating server 106 without the involvement of the core network (as any changes to these individual eNodeBs may not necessarily be visible to the core network).

In operation, UE 102 is called upon to report signal strength characteristics to its eNodeB 101. This may be via LTE protocol standard measurement reports, and may include one or more of BLER, RSSI, or other measures as described elsewhere herein. The signal strength of eNodeB 101 may be reported; the signal strength of eNodeB 104 may also be reported. UE 102 may also be requested to provide its location, which may be a GPS location obtained by the UE. As shown in FIG. 1, UE 102 is at the cell edge of eNodeB 101, and is able to see eNodeB 104 because it is within coverage area 107 of eNodeB 104. UE 102 may identify the availability of a nearby cell, eNodeB 104, and may report signal strength for both eNodeBs.

Signal strength and location of UE 102 may be associated together and stored in a database. In some embodiments, associating and storing may occur at eNodeB 101; in other embodiments, these steps may occur at coordinating server 106. In some embodiments, these may occur as a single step. Other parameters may also be associated in a single record with the signal strength and location, for example, UE identifying information such as IMEI.

Once signal strength and location are associated, the record becomes available to provide actionable information. In FIG. 1, it is eNodeB 104 that is causing the interference with eNodeB 101. Coordinating server 106 may perform analysis of the associated signal strength and location data, either at the time the data is submitted or at a later time, such as on a schedule, and with or without aggregation with other data from other UEs at or near that location. Coordinating server 106 may trigger alerts, reports creation, or other procedures as appropriate. In FIG. 1, coordinating server 106 may determine that no other transmitter is responsible for the interference observed at the location of UE 102. In some embodiments, this observation may be the result of analysis of many different UEs at many different times.

Coordinating server 106 may then direct eNodeB 104 to reduce its transmit power, shown in FIG. 1 as the reduction of coverage area from coverage area 107 to coverage area 108. UE 102 now falls outside coverage area 108, and interference is reduced with respect to UE 102's signal from eNodeB 101, which is not altered or affected. Alternatively, eNodeB 101 could be caused to increase transmit power. In some embodiments, eNodeB 104 may be directed to reduce transmit power for only individual frequencies, time slots, resource blocks, etc. In this way, power control of many individual radio resources may be achieved using UE measurement reports to provide fine instrumentation of the network.

In some embodiments, embodying a closed loop system, the coordinating server 106 may then wait for UE 102 or any other UE to report back from the same location to provide additional information regarding whether the adjustment to transmit power of eNodeB 104 was effective in reducing interference at that location. In some embodiments, coordinating server 106 may, via eNodeBs 101 and/or 104, request that UEs send measurement reports.

Figure 2:
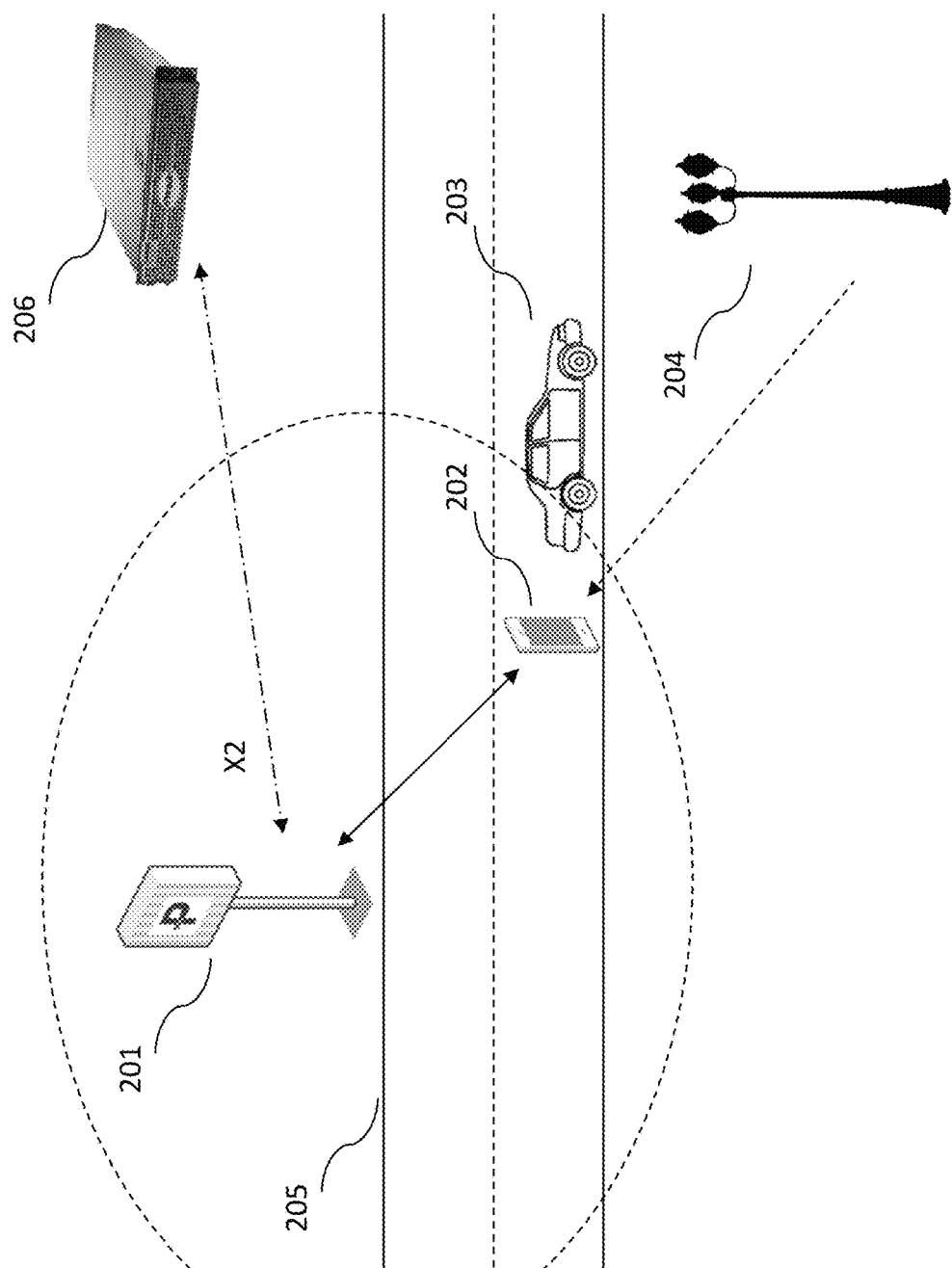
FIG. 2 is a schematic diagram of an interference scenario where a UE is attached to an eNB and experiences interference from a non-controllable point source, such as a misbehaving electronic ballast for a lamppost, in accordance with some embodiments.

FIG. 2 is a schematic diagram of an interference scenario where a UE is attached to an eNB and experiences interference from a non-controllable point source, such as a misbehaving electronic ballast for a lamppost, in accordance with some embodiments. UE 202 is attached to eNodeB 201, which is managed and controlled by coordination server 206. UE 202 is in a moving vehicle 203 along highway 205. Lamppost 204 is generating interference from a fixed location, for example, by using a fluorescent lamp ballast that is malfunctioning and emitting radio interference.

Coordinating server 206 may receive a first measurement report from UE 202 via eNodeB 201, indicating that signal quality is poor at a first location of UE 202. Coordinating server 206 may determine that the signal quality is below a threshold, and may request, via eNodeB 201, the frequency of measurement reports to be increased to, for example, once every 10 ms. The UE 202 may then provide multiple measurements of signal quality over the next few seconds.

At an ordinary rate of travel on a highway, and depending on how far away the lamppost is from the moving vehicle, the lamppost may be passed within some number of seconds or minutes. Based on measurement reports of signal quality returning to an ordinary level, coordinating server 206 may then end the measurement reporting from the base station.

Coordinating server 206 may at this time have a sufficient number of measurements of interference from UE 202 to be able to triangulate the location of the interfering source. Once the interfering source's location is identified, the coordinating server may check to see if the interference is being emitted from a source being managed by the network.

In this case, since the source of the interference is a lamppost, the interference source is not under the management of the network. To improve signal for UE 202 and for other UEs, therefore, coordinating server 206 may cause the transmission power of eNodeB 201 to be increased to compensate for the interference.

In this way, as the interference generated by lamppost 204 is originating at a fixed location, obtaining multiple measurements of the interference together with the location of UE 202 over time as it moves along the highway 205 may be used to narrow down the location of the interference emitter.

Figure 3:
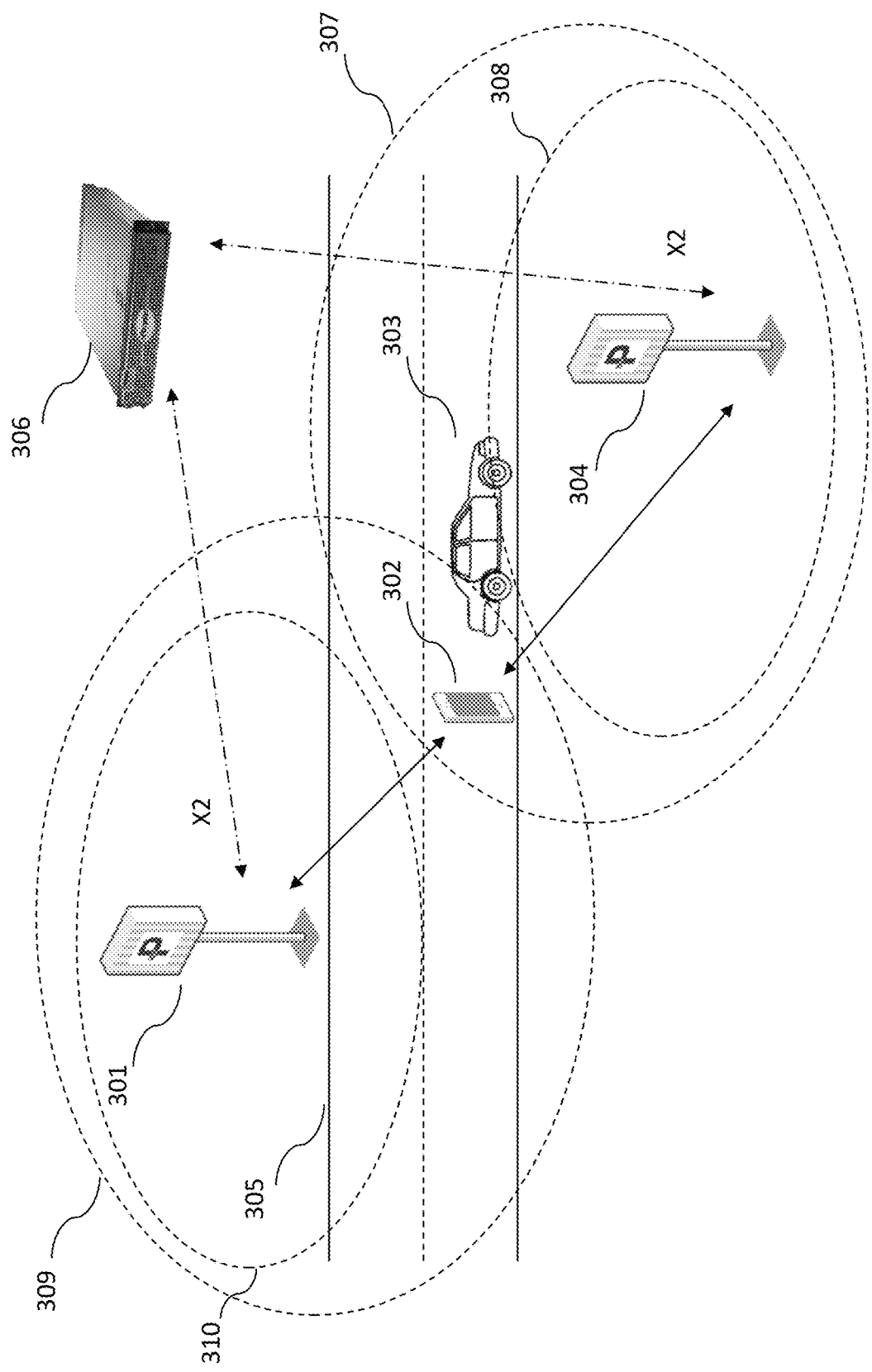
FIG. 3 is a schematic diagram of an interference scenario involving a highway, in accordance with some embodiments.

FIG. 3 is a schematic diagram of an interference scenario involving a highway, in accordance with some embodiments. In rush hour traffic, heavier load and slower UE velocities results in the cells being overloaded. By mining the UE signal data associated with observations made during a period of time, we can reduce the coverage areas of all eNBs in the area experiencing overloading. This may force some UEs to lose coverage and seek coverage from, e.g., an overlay macro cell, but overall can improve performance on the network until more capacity can be added.

In FIG. 3, base station 301 provides service to UE 302. UE 302 is in vehicle 303 and is moving down highway 305. UE 302 is also in communication with base station 304, as it is at the cell edge between base station 301 and base station 304. Base station 301 has initial coverage area 309; base station 307 has initial coverage area 307. Both base station 301 and base station 304 are in communication with a coordinating server via an X2 protocol connection. Base stations 301 and 304 may be small cells, in some embodiments, and in some embodiments a macro cell (not shown) provides backup overlay coverage to this entire area.

During most times of day, UE 302 is able to attach to base station 301, move into the overlapping region of coverage areas 307 and 309, and be handed over to base station 304 for satisfactory coverage. A small number of vehicles are on the highway at any given time, and the number of vehicles within any particular cell is also limited because UEs transit through the coverage areas at highway speeds.

However, in the depicted scenario, base stations 301 and 304 are not capable of handling UE loads during the rush hour commute. This is because the number of UEs on the road increases during rush hour, traffic to and from those UEs increases when drivers are not driving their vehicles, and the transit time for individual UEs is also much greater given the slower speed of travel. This results in a situation where UE 302, traveling between base station 301 and base station 304, experiences a call drop.

In the depicted scenario, the dropped calls may be monitored by the coordinating server 306 as follows. In one embodiment, call drops may be associated with location. A call drop during rush hour by another UE (not shown) may result in coordinating server 306 initiating the method described herein. Measurement reports may be requested from UE 302 for a particular time period. During that time period, the UE may detect coverage from each of base station 301 and 304, and may send this information to coordinating server 306. Reported coverage may be associated with the time of day, etc., as described herein, and saved into a database at coordinating server 306.

Based on call drop information from UE 302, and in some embodiments information from other UEs that is also collected in parallel and aggregated with the information from UE 302, the coordinating server may be able to determine that, at a particular location and at a particular time of day, handovers from base station 301 to base station 304 result in dropped calls. The coordinating server may use this information to adjust transmit power at both base station 301 and base station 304, such that the coverage area of base station 301 is reduced to area 310 and the coverage area of base station 304 is reduced to area 308. Since area 308 and area 310 no longer overlap, handovers between the two nodes may be reduced, and UEs that subsequently enter this area may hand over to the overlay macro cell, resulting in fewer dropped calls and improved user experience.

Another example scenario that is related to FIG. 3, pertaining to foliage, is described as follows. Base station emplacements along highways is often affected by seasonality, particularly in climates where trees have leaves in the summer but shed them in the winter. The presence or absence of foliage may be detected using UE measurement reports. Periodic sampling of signal quality and strength may reveal that signal strength is better in the winter, when there are fewer leaves. The coordinating server may aggregate signal strength from various UEs over time, and may be enabled to identify summer as a season when transmit power should be increased and winter as a season when transmit power should be decreased, in some embodiments. In some embodiments, an operator may trim foliage near a base station, and the present method in operation in the network may automatically detect that a change in signal quality is over a particular threshold and initiate a rebalancing and recalibration of transmit powers of cells in the nearby area. In some embodiments, a degradation of signal quality over time may be tracked, and once the degradation exceeds a threshold, the network operator may be notified to perform pruning of foliage in the area.

As an example of a usage of this method using call drop percentages, degraded signal leading to call drops could be identified using this method. Such degraded signal quality could be the result of differing network conditions during rush hour traffic on the highway versus during ordinary traffic. By tracking a quality parameter in conjunction with the position of one or more UEs over time, e.g., their velocities, or by tracking the quality parameter in conjunction with time, a pattern may be uncovered where network traffic moving at a particular velocity, or network traffic at a particular hour of the day, experiences and/or causes poor network quality.

Figure 4:
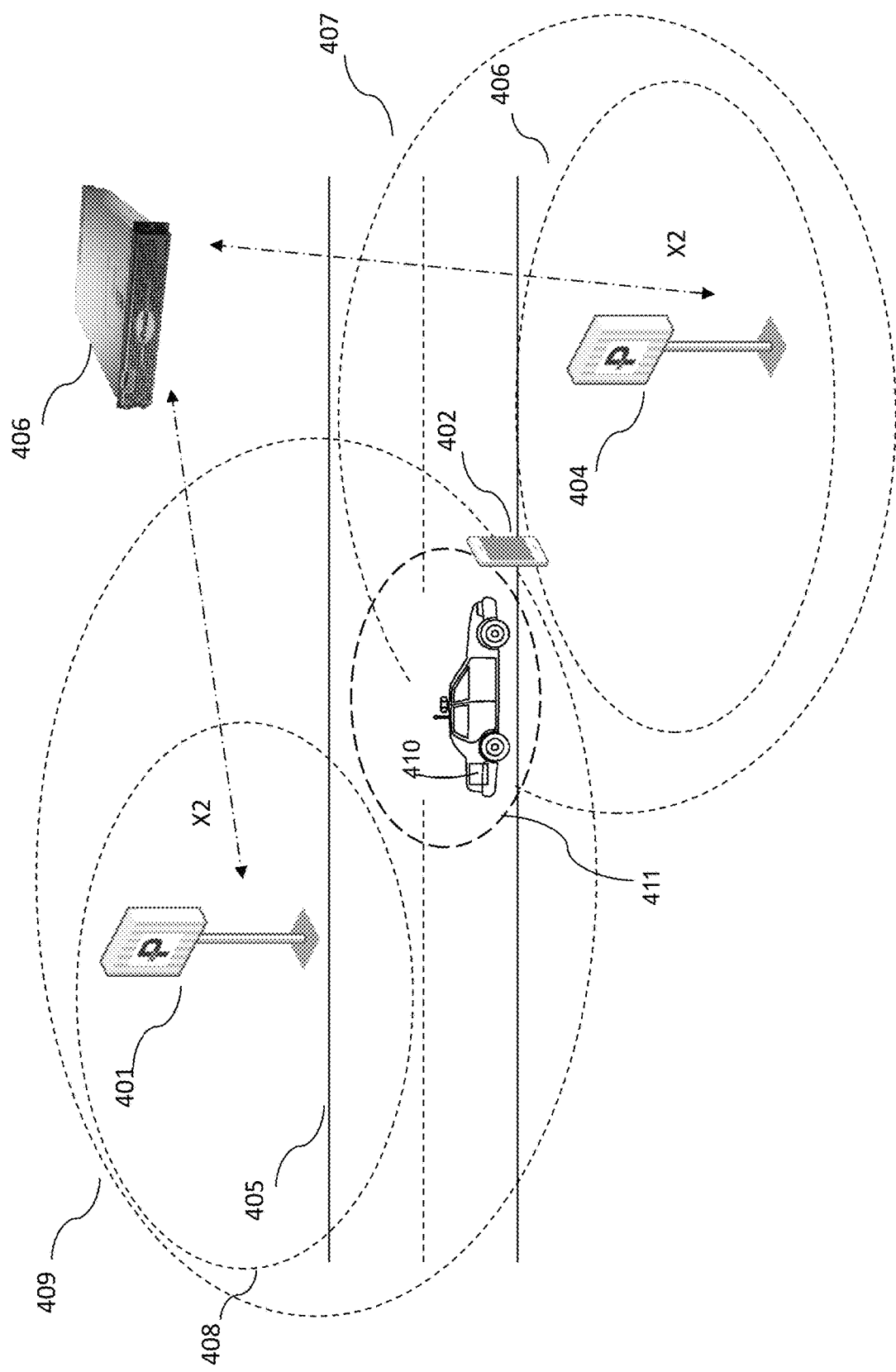
FIG. 4 is a schematic diagram of an interference scenario involving a mobile base station transiting through multiple coverage zones along a highway, in accordance with some embodiments.

FIG. 4 is a schematic diagram of an interference scenario involving a mobile base station transiting through multiple coverage zones along a highway, in accordance with some embodiments. Base station 401 and base station 404 provide service to an area along highway 405, including to UE 402. In-vehicle small cell base station 410 may be a mobile base station, and may transit along the highway, causing interference to UE 402. Base station 401 and base station 404 may have X2 protocol connections to a coordinating server 406. The initial coverage areas of base stations 401, 404 and 410 may be 409, 407, and 411, respectively.

At a first time, UE 402 may be camped on base station 401 or base station 409. The transit of vehicle 410 through the region results in interference to UE 402, which reports it as a measurement report to the network, via the small cell it is camped on. The measurement report may be sent to coordinating server 406. Coordinating server 406 may cause a measurement process to be initiated, such that UE 402 sends further measurement reports, and may associate the signal strength information from the measurement reports to the reported location of UE 402.

In some embodiments, the coordinating server 406 may be aware of and/or in control of mobile base station 410, as well, and may be aware that interference from base stations 401 and 404 is reducing the performance of devices attached to mobile base station 410.

Once a sufficient number of samples has been obtained, coordinating server 406 may determine that the coverage areas of base stations 401 and 404 should be reduced to area 408 and 406, respectively, in order to reduce interference to UE 402, and also to allow interference-free coverage in the region covered by the base station 410.

UE 402 may be requested to provide continued measurement reports, and thus may also be enabled to report when mobile base station 410 has left the area. Once the mobile base station has left the area, the interference no longer being a problem, transmit power and coverage from base stations 401 and 404 may be increased back to their original levels.

Use and computation of an appropriately fine-grained hysteresis period may be used, in some embodiments. This is because if the time delta for the transiting vehicle (mobile UE) is very small in comparison with the combined decision and decision transmission time, it may be better off for this UE to leave it as is, instead of introducing too many adjustments. Hysteresis can be computed/constructed by factoring in numerous factors, including UE velocity, predicted UE duration in the intersection area and X2 delay/decision processing latency.

Figure 5:
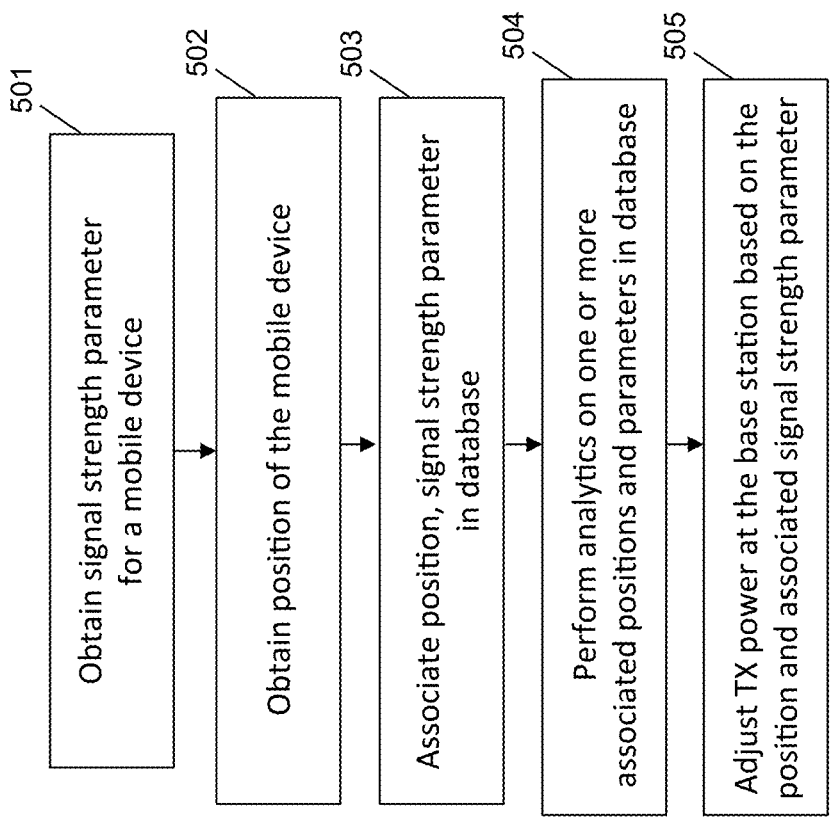
FIG. 5 is a flowchart depicting a method in accordance with some embodiments.

FIG. 5 is a flowchart depicting a method in accordance with some embodiments. At step 501, a signal strength parameter is obtained for a mobile device. The signal strength parameter may be sampled at a base station or at a mobile device, in some embodiments. The signal strength parameter may be obtained by requesting a measurement report from the mobile device. The signal strength parameter may be one parameter or a plurality of parameters; for example, a UE measurement report may return signal strength of more than one nearby base station.

At step 502, a position is obtained for a mobile device. The position may be a GPS location, or may be another type of location. The position may be requested by the base station. The position may be determined by the base station using the same mechanism used by a base station to determine position in case of an emergency call, such as a 911 call. The position may have any degree of accuracy, but preferably will have accuracy within a few tens of meters.

The information obtained in steps 501 and 502 are then combined. At step 503, the position and signal strength parameters are associated in a database. The database stores information records of locations and signal strength parameters, including records from multiple UEs, records over time, records from multiple base stations, etc.

The database may be enabled to permit querying by position/location, by UE identifier, by base station, by signal strength, by a combination thereof, or by another parameter or combination of parameters as disclosed herein. Parametric search may be permitted over a range of values, and over multiple parameters, such that a search may be performed for, e.g., BLERs for UEs in the 700-800 MHz band within 5 km of a particular geographic location. This searchability of the database is what enables analytic data processing to be performed on the information records. The database may be specifically configured to permit queries on geographic locations; for example, the database may permit querying for records within a radius of a given point.

The database may also be enabled to permit querying by one signal strength parameter or more than one signal strength parameter. Various signal strength parameters may be related, and the database may permit querying by equivalent parameters. The database may also permit storage and search of key performance indicators (KPI) related to the signal strength parameter, for example, derived parameters such as the signal strength squared, $RSRQ=N*RSRP/RSSI$, or other derived parameters. In some embodiments, these equivalencies may be created on the fly, or via indexing. In some embodiments, these other signal quality parameters may be directly collected by base station sampling or by requesting them from a UE.

The database may be located at a base station, some base stations, the coordinating server, or more than one of the above. The database may be shared, sharded, synchronized, backed up, or otherwise maintained to enable the database operator and/or network operator to perform useful queries, according to practices known by those of ordinary skill in the art. The database may be configured to enable efficient retrieval of geographic information, using parameters such as point and radius. The database may be indexed along one or more parameters, enabling rapid retrieval of results, including rapid retrieval of results on predetermined searches. For example, the system could be configured to provide weekly reports on one or more KPIs, and these weekly reports could be pre-indexed. Indexing of the database may be configured to occur at intervals. The database may be configured to display results in real time as they are received.

The database may be implemented using a structured query language (SQL) database system, such as MySQL, Postgres, or another database, such as BerkeleyDB.

At step 504, analytics may be performed on one or more associated positions and parameters in the database, as described elsewhere herein. For example, the database as described with reference to step 503 may be queried to find other incidences of dropped calls at or near the location of the position obtained at step 502. As another example, the database may be queried to determine what locations experienced a decrease in signal quality during a specified time period and over a particular signal quality decrease threshold. Other queries and analytics are contemplated; indeed, there are many potential possibilities.

Analytics may be performed on an aggregate of multiple records in the database, in some embodiments. For example, aggregating records over multiple locations may enable a network operator to examine all locations in the network and find those locations where the network is not performing well. Aggregating or rolling up records over multiple UEs may enable a network operator to obtain more comprehensive sample data, rather than relying on a single UE to provide all needed information. Aggregating over one or more records in this way can be used to enable the network to wait until a threshold of record measurements has been reached, such as a minimum number of call drops, before performing a network management action. Alternatively, in cases where a single UE measurement is below a minimum desired service threshold, or in cases where a VIP UE is being serviced, aggregation may not be needed and action may be taken immediately based on a single measurement record. The resulting aggregate or other data may be displayed to an administrative user at a text-based console, web dashboard, visual dashboard, report, data visualization, or via another means.

In some embodiments, analytics may be accompanied by heuristics, deep learning, neural networks, or other means for performing one of the following: assessing the current state of the network; predicting a future state of the network; or assigning a probable cause of a network event, such as a foliage trimming event.

At step 505, a sample network management action is shown. Here, a transmit power of an interfering base station is adjusted based on a record, the record including a position and an associated signal strength parameter. This corresponds roughly to the interference scenario shown and described in FIG. 1. Other network management actions are contemplated.

The steps shown in FIG. 5 may be performed at a mobile device, at a base station, or at another node, such as at a coordinating server, or initiated at one node and performed by another node. For example, steps 501-502 may be initiated at a coordinating server, and performed by a base station, or in the case that the obtained position is obtained at a mobile device, passed along by a base station, and performed at a mobile device. Steps 503 and 504 may be performed at a coordinating server or at a base station. Step 505 may be initiated at a coordinating server and performed at a base station, or performed entirely at a base station.

In some embodiments, a base station may communicate with a coordinating server, for example, via an X2 protocol or other proprietary or standard protocol. The communication may be via a signaling path on an LTE network.

FIG. 6 is a schematic diagram of an enhanced eNodeB, in accordance with some embodiments. Enhanced eNodeB 600 may include processor 602, processor memory 604 in communication with the processor, baseband processor 606, and baseband processor memory 608 in communication with the baseband processor. Enhanced eNodeB 600 may also include first radio transceiver 610 and second radio transceiver 612, internal universal serial bus (USB) port 616, and subscriber information module card (SIM card) 618 coupled to USB port 614. In some embodiments, the second radio transceiver 612 itself may be coupled to USB port 616, and communications from the baseband processor may be passed through USB port 616.

A self-organizing network (SON) module 630 may also be included, which may include a database (not shown), in some embodiments, or which may be in communication with a coordination server (not shown), in some embodiments, or both, in some embodiments.

Processor 602 and baseband processor 606 are in communication with one another. Processor 602 may perform routing functions, and may determine if/when a switch in network configuration is needed. Baseband processor 606 may generate and receive radio signals for both radio transceivers 610 and 612, based on instructions from processor 602. In some embodiments, processors 602 and 606 may be on the same physical logic board. In other embodiments, they may be on separate logic boards.

The first radio transceiver 610 may be a radio transceiver capable of providing LTE eNodeB functionality, and may be capable of higher power and multi-channel OFDMA. The second radio transceiver 612 may be a radio transceiver capable of providing LTE UE functionality. Both transceivers 610 and 612 are capable of receiving and transmitting on one or more LTE bands. In some embodiments, either or both of transceivers 610 and 612 may be capable of providing both LTE eNodeB and LTE UE functionality. Transceiver 610 may be coupled to processor 602 via a Peripheral Component Interconnect-Express (PCI-E) bus, and/or via a daughtercard. As transceiver 612 is for providing LTE UE functionality, in effect emulating a user equipment, it may be connected via the same or different PCI-E bus, or by a USB bus, and may also be coupled to SIM card 618.

SIM card 618 may provide information required for authenticating the simulated UE to the evolved packet core (EPC). When no access to an operator EPC is available, a local EPC on the enhanced eNodeB itself (not shown) may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 600 is not an ordinary UE but instead is a special UE for providing backhaul to device 600.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 610 and 612, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 602 for reconfiguration.

Other elements and/or modules may also be included, such as a home eNodeB, a local gateway (LGW), or another module. Additional radio amplifiers, radio transceivers and/or wired network connections may also be included.

Processor 602 may identify the appropriate network configuration, and may perform routing of packets from one network interface to another accordingly. Processor 602 may use memory 604, in particular to store a routing table to be used for routing packets. Baseband processor 606 may perform operations to generate the radio frequency signals for transmission or retransmission by both transceivers 610 and 612. Baseband processor 606 may also perform operations to decode signals received by transceivers 610 and 612. Baseband processor 606 may use memory 608 to perform these tasks.

FIG. 7 is a schematic diagram of a SON coordinator server, in accordance with some embodiments. SON coordinator 700 includes processor 702 and memory 704, which are configured to provide the functions described herein. Also present are radio access network coordination/signaling (RAN Coordination and signaling) module 706, RAN proxying module 708, and routing virtualization module 710.

RAN coordination module 706 may include database 706a, which may store associated UE signal quality parameters and location information as described herein. In some embodiments, SON coordinator server 700 may coordinate multiple RANs using coordination module 706. If multiple RANs are coordinated, database 706a may include information from UEs on each of the multiple RANs.

In some embodiments, coordination server may also provide proxying, routing virtualization and RAN virtualization, via modules 710 and 708. In some embodiments, a downstream network interface 712 is provided for interfacing with the RANs, which may be a radio interface (e.g., LTE), and an upstream network interface 714 is provided for interfacing with the core network, which may be either a radio interface (e.g., LTE) or a wired interface (e.g., Ethernet). Signaling storm reduction functions may be performed in module 706.

SON coordinator 700 includes local evolved packet core (EPC) module 720, for authenticating users, storing and caching priority profile information, and performing other EPC-dependent functions when no backhaul link is available. Local EPC 720 may include local HSS 722, local MME 724, local SGW 726, and local PGW 728, as well as other modules. Local EPC 720 may incorporate these modules as software modules, processes, or containers. Local EPC 720 may alternatively incorporate these modules as a small number of monolithic software processes. Modules 706, 708, 710 and local EPC 720 may each run on processor 702 or on another processor, or may be located within another device.

FIG. 8 is a system architecture diagram of an exemplary network configuration, in accordance with some embodiments. Base stations 802 and 804 are connected via an S1-AP and an X2 interface to coordination server 806. Base stations 802 and 804 are eNodeBs, in some embodiments. Coordination server 806 is connected to the evolved packet core (EPC)/Core Network 808 via an S1 protocol connection and an S1-MME protocol connection. Coordination of base stations 802 and 804 may be performed at the coordination server. In some embodiments, the coordination server may be located within the EPC/Core Network 808. EPC/Core Network 808 provides various LTE core network functions, such as authentication, data routing, charging, and other functions. In some embodiments, mobility management is performed both by coordination server 806 and within the EPC/Core Network 808. EPC/Core Network 808 provides, typically through a PGW functionality, a connection to the public Internet 810.

In some embodiments, coordination server 806 may act as an S1 proxy, X2 proxy, back-to-back proxy, or other proxy for some or all eNodeBs connected to it relative to EPC/core network 808. By leveraging its position in the network, coordination server 806 may appear to be a single eNodeB to the network, while managing multiple eNodeBs connected to it. In some embodiments, coordination server may route X2 messages, handover tunnel data, and other data among its connected base stations, and may perform handovers and other signaling-related procedures among its connected base stations without the involvement of EPC/core network 808.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one or more of IEEE 802.11a/b/g/n/ac. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces. In some embodiments, the base stations described herein may use programmable frequency filters. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported. The embodiments disclosed herein can be used with a variety of protocols so long as there are contiguous frequency bands/channels. Although the method described assumes a single-in, single-output (SISO) system, the techniques described can also be extended to multiple-in, multiple-out (MIMO) systems. Wherever IMSI or IMEI are mentioned, other hardware, software, user or group identifiers, can be used in conjunction with the techniques described herein.

Those skilled in the art will recognize that multiple hardware and software configurations could be used depending upon the access protocol, backhaul protocol, duplexing scheme, or operating frequency band by adding or replacing daughtercards to the dynamic multi-RAT node. Presently, there are radio cards that can be used for the varying radio parameters. Accordingly, the multi-RAT nodes of the present invention could be designed to contain as many radio cards as desired given the radio parameters of heterogeneous mesh networks within which the multi-RAT node is likely to operate. Those of skill in the art will recognize that, to the extent an off-the shelf radio card is not available to accomplish transmission/reception in a particular radio parameter, a radio card capable of performing, e.g., in white space frequencies, would not be difficult to design.

Those of skill in the art will also recognize that hardware may embody software, software may be stored in hardware as firmware, and various modules and/or functions may be performed or provided either as hardware or software depending on the specific needs of a particular embodiment.

In the present disclosure, the words location and position may be used in various instances to have the same meaning, as is common in the relevant art.

Although the scenarios for interference mitigation are described in relation to macro cells and micro cells, or for a pair of small cells or pair of macro cells, the same techniques could be used for reducing interference between any two cells, in which a set of cells is required to perform the CoMP methods described herein. The applicability of the above techniques to one-sided deployments makes them particularly suitable for heterogeneous networks, including heterogeneous mesh networks, in which all network nodes are not identically provisioned.

In any of the scenarios described herein, where processing may be performed at the cell, the processing may also be performed in coordination with a cloud coordination server. The eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, in various orders as necessary.

Although the above systems and methods for providing interference mitigation are described in reference to the Long Term Evolution (LTE) standard, one of skill in the art would understand that these systems and methods could be adapted for use with other wireless standards or versions thereof. For example, certain methods involving the use of a virtual cell ID are understood to require UEs supporting 3GPP Release 11, whereas other methods and aspects do not require 3GPP Release 11.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims. For example, association of a call drop KPI with a location may be performed in the same system where association of a signal strength parameter with a location is performed.

The invention claimed is:

1. A method, comprising:
receiving a signal quality measurement for a mobile device at a coordinating server situated between a radio access network (RAN) and a core network;
storing, at an aggregation server, the signal quality measurement, a user equipment identifier of the mobile device, a time of the signal quality measurement, and a location of a mobile device location as a record;
aggregating, at the aggregation server, the location with mobile device measurement reports into a measurement record;
storing, at the coordinating server, at least one statistical measure of a signal quality measurement of aggregated additional records;
updating, at the coordinating server, a minimum and a maximum threshold value for an operational network parameter based on the stored at least one statistical measure; and
adjusting at the aggregation server, the operational network parameter based on the minimum and the maximum threshold value,
compiling, at a base station, a record of call drops per aggregated location at a database;
performing, at the base station, prediction of future call drops based on the compiled record of call drops per aggregated location and a position parameter, thereby providing an improvement to the radio access network over a geographic area.

2. The method of claim 1, wherein the signal quality measurement is one of call drop rate and block error rate, and wherein a mobile device location is derived from a global positioning service (GPS) coordinate location associated with the mobile device, and wherein the mobile device is a user equipment (UE).

3. The method of claim 1, wherein the mobile device is a user equipment (UE), the base station is an eNodeB, and the database is located at a gateway.

4. The method of claim 1, wherein the mobile device location is derived from a location of an associated tracking area or eNodeB.

5. The method of claim 1, wherein the aggregation server aggregates stored signal quality measurements from more than one mobile device.

6. The method of claim 1, wherein the aggregation server is the base station and an in-data path network node in a data path between the base station and a core network.

7. The method of claim 1, further comprising presenting one of real-time network conditions, historical network conditions, and projected future network conditions based on the stored signal quality measurement and the stored mobile device location.

8. The method of claim 1, wherein the stored at least one statistical measure is a mean and a standard deviation.

9. The method of claim 8, further aggregating, at the coordinating server, further additional records from the database that match a traffic type at the mobile device, and storing a second mean and a second standard deviation value of the signal strength parameter of the aggregated further additional records.

10. The method of claim 1, further comprising aggregating, at the coordinating server, the additional records from the database that match a second set of criteria, and storing a second statistical measure of the aggregated additional records, and updating the minimum and the maximum threshold value based on the second statistical measure.

11. The method of claim 10, wherein the second set of criteria is a second period of time for measurement reports received at the base station.

12. The method of claim 1, wherein a signal strength parameter is block error rate (BLER), and further comprising receiving a traffic type.

13. The method of claim 1, wherein a signal strength parameter is radio signal strength indicator (RSSI) for a voice call.

14. The method of claim 1, wherein the operational network parameter is repositioning of at least one of a plurality of antennas of the base station.

15. The method of claim 1, further aggregating, at the coordinating server, further additional records from the database based on a number of calls dropped by any one of the mobile device, the base station, and a distance from the base station.

16. The method of claim 1, wherein the mobile device is a network probe or sampler sending measurement reports to the base station or the coordinating server.

* * * * *